United States Patent
Devonport et al.

(10) Patent No.: US 6,551,393 B2
(45) Date of Patent: Apr. 22, 2003

(54) METHODS OF MAKING A PARTICLE HAVING AN ATTACHED STABLE FREE RADICAL

(75) Inventors: Wayne Devonport, Tewksbury, MA (US); Robert S. Whitehouse, Lexington, MA (US); Russell L. Warley, Erie, PA (US); Thimma R. Rawalpally, Florence, SC (US); Hairuo Tu, Burlington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/061,948

(22) Filed: Feb. 1, 2002

(65) Prior Publication Data

US 2002/0098144 A1 Jul. 25, 2002

Related U.S. Application Data

(62) Division of application No. 09/089,363, filed on Jun. 3, 1998.

(51) Int. Cl.$^7$ ................................. C09D 11/00
(52) U.S. Cl. .................. 106/31.6; 106/31.75; 106/472; 106/473; 423/449.2; 423/449.9; 524/495; 524/496; 524/513; 524/514; 524/528; 524/521; 524/523; 525/165; 525/175; 525/192
(58) Field of Search .......................... 423/449.2, 449.9; 106/31.6, 31.75, 472, 473; 524/496, 513, 514, 528, 521, 523, 495; 525/192, 165, 175

(56) References Cited

U.S. PATENT DOCUMENTS

| | | | |
|---|---|---|---|
| 2,121,535 A | 6/1938 | Amon | 106/473 |
| 2,439,442 A | 4/1948 | Amon et al. | 23/209.1 |
| 2,793,100 A | 5/1957 | Weihe | 423/460 |

(List continued on next page.)

FOREIGN PATENT DOCUMENTS

| | | |
|---|---|---|
| DE | 23 55 758 | 5/1975 |
| EP | 0 475 075 A1 | 3/1992 |
| GB | 862018 | 3/1961 |

(List continued on next page.)

OTHER PUBLICATIONS

Derwent Abstract, AN No. 80/03330C, "Sulphonated Carbon Pigment Production by Treating Technical Grade Carbon with Hot Aqueous Acid," SU,A, 659523, Apr. 1979.
Derwent Abstract, AN No. 82–28019E, "Penetrating Flexographic Print Ink Based Polyacrylic Resin," Oct. 17, 1979, SU,A, 834062.
Derwent Abstract, AN No. 86–335147, "Wear Resistant Rubber Composition for Tire Tread Rubber," Apr. 30, 1985, JPA 61–250042, Nov. 1986.

(List continued on next page.)

*Primary Examiner*—Peter D. Mulcahy

(57) ABSTRACT

A modified particle is disclosed wherein a particle has an attached group having the formula:

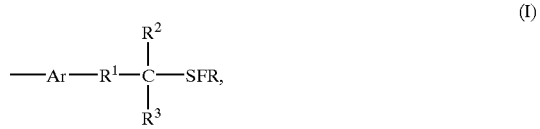

(I)

wherein Ar represents an aromatic group; $R^1$ represents a bond, an arylene group, an alkylene group,

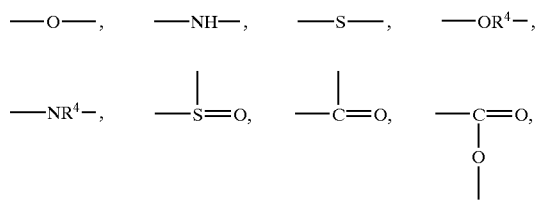

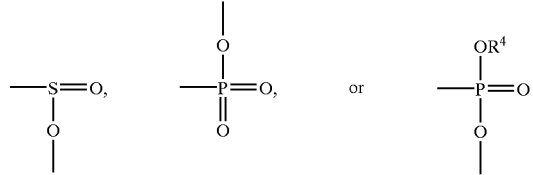

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$, or $-SR^5$, wherein $R^5$, which is the same or different, represents an alkyl group or an aryl group; and SFR represents a stable free radical. Also disclosed is a modified particle or aggregate having attached a group having the formula:

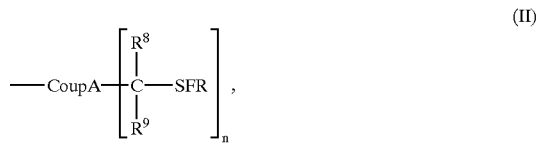

(II)

wherein CoupA represents a Si-containing group, a Ti-containing group, or a Zr-containing group; $R^8$ and $R^9$, which can be the same or different, represent hydrogen, an alkyl group, an aryl group, $-OR^{10}$, $-NHR^{10}$, $-NR^{10}R^{10}$, or $-SR^{10}$, wherein $R^{10}$ represents an alkyl group or an aryl group; SFR represents a stable free radical; and n is an integer of from 1 to 3. A modified particle having an attached $-SFR$ or $-X-SFR$ is additionally disclosed. Also, modified particles with attached polymers are also disclosed as well as methods of making the modified particles.

11 Claims, No Drawings

U.S. PATENT DOCUMENTS

| | | | |
|---|---|---|---|
| 2,867,540 A | 1/1959 | Harris | 106/476 |
| 3,011,902 A | 12/1961 | Jordon | 106/30 R |
| 3,025,259 A | 3/1962 | Watson et al. | 106/476 |
| 3,317,458 A | 5/1967 | Clas et al. | 260/41.5 |
| 3,335,020 A | 8/1967 | Aboytes et al. | 106/476 |
| 3,423,391 A | 1/1969 | Kindler et al. | 260/141 |
| T860,001 I4 | 3/1969 | Gessler | 260/41.5 |
| 3,528,840 A | 9/1970 | Aboytes | 106/473 |
| 3,671,476 A | 6/1972 | Terai et al. | 260/23 |
| 3,686,111 A | 8/1972 | Makhlouf et al. | 524/530 |
| 4,014,844 A | 3/1977 | Vidal et al. | 106/472 |
| 4,265,768 A | 5/1981 | Beasley et al. | 210/682 |
| 4,320,011 A | 3/1982 | Sato et al. | 210/694 |
| 4,366,139 A | 12/1982 | Kühner et al. | 423/449 |
| 4,530,961 A | 7/1985 | Nguyen et al. | 106/20 R |
| 4,581,429 A | 4/1986 | Solomon et al. | 526/220 |
| 4,597,794 A | 7/1986 | Ohta et al. | 106/20 C |
| 4,820,751 A | 4/1989 | Takeshita et al. | 523/215 |
| 4,831,011 A | 5/1989 | Oikawa et al. | 502/406 |
| 4,880,857 A | 11/1989 | Mori et al. | 523/205 |
| 5,130,363 A | 7/1992 | Scholl et al. | 524/392 |
| 5,159,009 A | 10/1992 | Wolff et al. | 106/475 |
| 5,184,148 A | 2/1993 | Suga et al. | 106/20 R |
| 5,190,582 A | 3/1993 | Shinozuka et al. | 106/20 D |
| 5,281,261 A | 1/1994 | Lin | 106/20 R |
| 5,282,887 A | 2/1994 | Gay et al. | 106/261 |
| 5,322,912 A | 6/1994 | Georges et al. | 526/204 |
| 5,401,313 A | 3/1995 | Supplee et al. | 106/20 D |
| 5,401,804 A | 3/1995 | Georges et al. | 525/267 |
| 5,412,047 A | 5/1995 | Georges et al. | 526/204 |
| 5,449,724 A | 9/1995 | Moffat et al. | 526/204 |
| 5,498,679 A | 3/1996 | Moffat et al. | 526/204 |
| 5,530,079 A | 6/1996 | Veregin et al. | 526/219.3 |
| 5,545,504 A | 8/1996 | Keoshkerian et al. | 430/137 |
| 5,554,739 A | 9/1996 | Belmont | 534/885 |
| 5,559,169 A | 9/1996 | Belmont et al. | 523/215 |
| 5,571,311 A | 11/1996 | Belmont et al. | 106/20 R |
| 5,575,845 A | 11/1996 | Belmont et al. | 106/712 |
| 5,610,250 A | 3/1997 | Veregin et al. | 526/219.3 |
| 5,630,868 A | 5/1997 | Belmont et al. | 106/31.75 |
| 5,654,357 A | 8/1997 | Menashi et al. | 524/495 |
| 5,672,198 A | 9/1997 | Belmont | 106/20 |
| 5,698,016 A | 12/1997 | Adams et al. | 106/31.6 |
| 5,707,432 A | 1/1998 | Adams et al. | 106/31.6 |
| 5,713,988 A | 2/1998 | Belmont et al. | 106/31.6 |
| 5,714,993 A | 2/1998 | Keoshkerian et al. | 347/95 |
| 5,723,511 A | 3/1998 | Kaznaier et al. | 522/35 |
| 5,728,747 A | 3/1998 | Kaznaier et al. | 522/11 |

FOREIGN PATENT DOCUMENTS

| | | |
|---|---|---|
| GB | 1191872 | 5/1970 |
| GB | 2 188 311 A | 9/1987 |
| JP | 56078629 | 6/1981 |
| JP | 59/82467 | 5/1984 |
| JP | 63-183227 | 7/1987 |
| JP | 62/250073 | 10/1987 |
| JP | 6067421 | 3/1994 |
| WO | WO 91/02034 | 2/1991 |
| WO | WO 91/15425 | 10/1991 |
| WO | WO 92/13983 | 8/1992 |
| WO | WO 95/01838 | 1/1995 |
| WO | WO 96/18688 | 6/1996 |
| WO | WO 96/37547 | 11/1996 |

OTHER PUBLICATIONS

Derwent Abstract, AN No. 93–261471, "Carbon Black for Coating Magnetic Recording Media—Having Silicon Dioxide Coating, Giving Good Dispensability, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstract of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43 No. 4, pp 289–298, 164, no month.

Zoheidi et al., "Role of Oxygen Surface Groups in Catalysis of Hydrogasification of Carbon Black by Potassium Carbonate," Carbon, vol. 25, No. 6, pp. 809–819, 1987.

Delamar et al., J. Am. Chem. Soc. 1992, 114, 5883–5884.

Huang et al., "Surface–Confined Living Radical Polymerization for Coatings in Capillary Electrophoresis," Analytical Chemistry, vol. 70, No. 19., Oct. 1, 1998, pp. 4023–4029.

Huang et al., "Surface–Initiated Radical Polymerization of Porous Silica," Analytical Chemistry, vol. 69, No. 22, Nov. 15, 1997, pp. 4577–4580.

David Rotman, "Living Polymerization Promises Novel Materials" Chemical Week, Jun. 11, 1997. pp 41.

Derwent Abstract, Acc. No. 84–155581/25 "Surface treatment of carbon fibre acting as cathode comprises treating with electricity in water in presence of basic organic amide," JP 59082467A.

Wang et al., "Controlled/Living Radical Polymerization. Atom Transfer Radical Polymerization in the Presence of Trnasition–Metal Complexes", American Chemical Society pp. 3014–3015 (1995).

Goto et al., "Mechanism and Kinetics of Iodide–Mediated Polymerization of Styrene", Macromolecules 1998, 31, 2809–2814.

METHODS OF MAKING A PARTICLE HAVING AN ATTACHED STABLE FREE RADICAL

This application is a divisional of U.S. patent application Ser. No. 09/089,363 filed Jun. 3, 1998, which is incorporated in its entirety by reference herein.

BACKGROUND OF THE INVENTION

The present invention relates to particles, such as carbon black, having an attached stable free radical which permits the formation of blocked radical sources. The present invention further relates to methods of preparing and using such modified particles.

The role of carbon black as a thermal stabilizer in polymeric systems is discussed by W. L. Hawkins, R. H. Hansen, W. Matreyek, F. H. Winslow; *J. Applied Polymer Science*, vol. 1, pages 37–42, 1959; J. T. Cruver, K. W. Rollmann: *J. Applied Polymer Science*, vol. 8, pages 1169–83, 1964, and by G. Ivan, M. Giurgina: *Revue Roumaine de Chemie*, vol. 29, number 8, pages 639–646, 1984. In each discussion the mechanism is through phenolic and quinone oxygen groups on the carbon black surface behaving either as radical traps or peroxide decomposers. One skilled in the art, however, would consider these sites unavailable as initiating sites for polymerization processes.

Belmont et al. (J. A. Belmont, J. M. Funt: International Rubber Conference, Essen, Germany, Jun. 24–27, 1991) identified the presence of peroxide groups, typically in the range of 0.1 to 0.4 micromoles/sq meter, on the carbon black surface. However, the majority (greater than 80%) of the peroxide groups are thermally stable to heat treatment at 200° C. and hence cannot be considered to be potential initiating sites for radical polymerization.

Tsubokawa et al. (K. Fujiki, N. Tsubokawa, Y. Sone: *Polymer J.*, vol. 22, number 8, pages 661–70, 1990, and N. Tsubokawa: *Prog. Polymer Science*, vol. 17, pages 417–70, 1992) discuss growing polymers from an activated carbon black surface by first attaching a reactive group via the oxygen groups on the carbon black surface. Typical examples include the use of glycidyl methacrylate where the glycidyl group reacts with phenolic hydroxyl groups on the carbon black surface providing a vinyl functionality; the reaction of 4,4' azo bis-(4-cyanovaleric acid) whereby the isocyanate group reacts with phenolic hydroxyl groups and subsequent heating decomposes the azo group to generate an alkyl radical; and the reaction of the phenolic hydroxyl groups with butyl lithium which can then be used as an initiation site for anionic polymerization.

All of these approaches require the presence of oxygen groups on the carbon black surface. Since the level of reactive hydroxyl and carboxylic acid groups, relative to the above approaches, present on a typical furnace or thermal carbon black is typically 0.01 to 0.1 micromoles/sq meter, the number of potential initiation sites is quite low.

Further, subsequent polymerization from these activated sites will most likely occur in the normal manner for free radical polymerization with the chains being irreversible terminated by chain combination reactions, combination with unreacted oxygen groups on the carbon black surface, and/or the addition of chain stoppers. In all cases the polymerization cannot be reinitiated. Accordingly, there is a need to provide particles with attached stable free radicals which overcome the above-described limitations.

SUMMARY OF THE INVENTION

In accordance with the purpose of the present invention, the present invention relates to a modified particle which includes a particle having an attached group having the formula:

wherein Ar represents an aromatic group; $R^1$ represents a bond, an arylene group, an alkylene group,

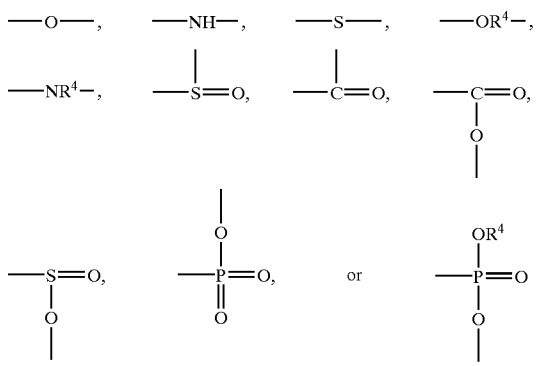

wherein $R^4$ is an alkyl or alkylene group or an aryl or arylene group; $R^2$ and $R^3$, which can be the same or different, represent hydrogen, an alkyl group, an aryl group, —$OR^5$, —$NHR^5$, —$NR^5R^5$ or —$SR^5$, wherein $R^5$, which can be the same or different, represents hydrogen, an alkyl group or an aryl group; and SFR represents a stable free radical.

The present invention further relates to a modified particle or aggregate wherein the particle or aggregate is a carbon-metal multiphase aggregate, a carbon-silicon containing species multiphase aggregate, a metal oxide, or a metal hydroxide. Attached to the particle or aggregate is a group having the formula:

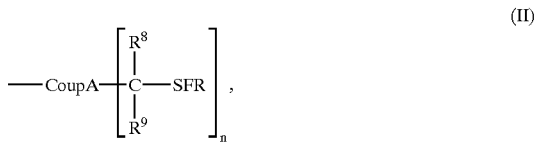

wherein CoupA represents a Si-containing group, a Ti-containing group, or a Zr-containing group; $R^8$ and $R^9$, which can be the same or different, represent hydrogen, an alkyl group, an aryl group, —$OR^{10}$, —$NHR^{10}$, —$NR^{10}R^{10}$, or —$SR^{10}$, wherein $R^{10}$, which can be the same or different, represents hydrogen, an alkyl group or an aryl group; SFR represents a stable free radical, and n is an integer of from 1 to 3.

The present invention further relates to a modified particle with an attached polymer wherein the modified particle has an attached group having the formula:

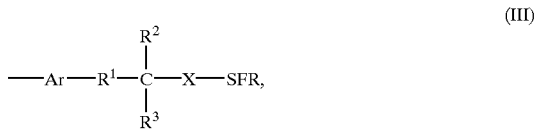

wherein X represents a polymer formed from at least one polymerizable vinyl or diene based monomer, Ar represents an aromatic group; $R^1$ represents a bond, an arylene group, an alkylene group,

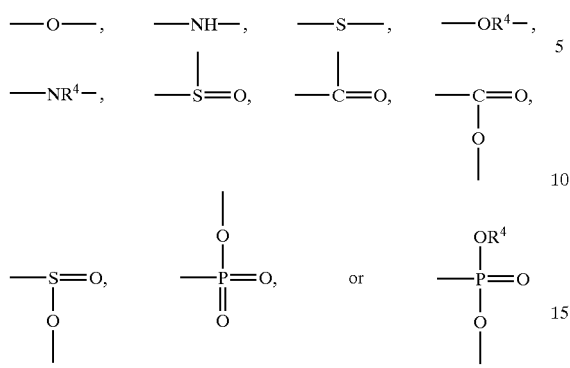

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$ or $-SR^5$, wherein $R^5$, which can be the same or different, represents an alkyl group or an aryl group; and SFR represents a stable free radical.

The present invention also relates to another modified particle having an attached polymer. The particle is a carbon-metal phase aggregate, a carbon-silicon containing species phase aggregate, a metal oxide, or a metal hydroxide. Attached to the particle is a group having the formula:

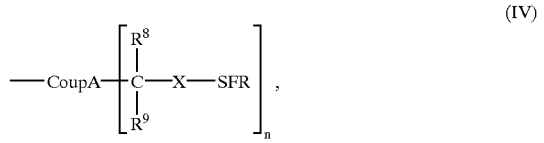

(IV)

wherein CoupA represents a Si-containing group, a Ti-containing group, or a Zr-containing group; $R^8$ and $R^9$, which can be the same or different, represent hydrogen, an alkyl group, an aryl group, $-OR^{10}$, $-NHR^{10}$, $-NR^{10}R^{10}$, or $-SR^{10}$, wherein $R^{10}$, which can be the same or different, represents an alkyl group or an aryl group; SFR represents a stable free radical, X is a polymer formed from at least one polymerizable monomer, and n is an integer of from 1 to 3.

The present invention, in addition, relates to a method for preparing and using these various modified particles. The method includes reacting a particle having an attached vinyl substituted aromatic group with a reactive free radical source and a stable free radical source to form a reaction product. The present application further relates to forming the modified particles with an attached polymer by reacting the reaction product with a polymerizable monomer.

The present invention further relates to a method of making a modified particle comprising a particle having attached a group having the formula:

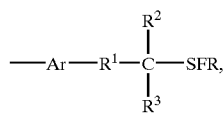

(I)

wherein Ar represents an aromatic group; $R^1$ represents a bond, an arylene group, an alkylene group,

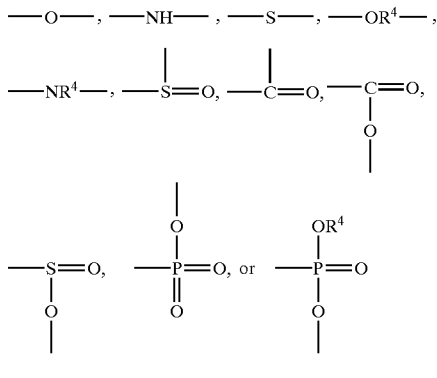

wherein $R^4$ is an alkyl or alkylene group or an aryl or arylene group; $R^2$ and $R^3$, which can be the same or different, represent hydrogen, an alkyl group, an aryl group, $-OR^5$, $-NHR^5$, $-NR^5R^5$, or $-SR^5$, wherein $R^5$, which is the same or different, represents an alkyl group or an aryl group; and SFR represents a stable free radical, wherein said method comprises reacting a) a particle having attached an aromatic group with a group containing an abstractable proton and which leaves behind a carbon-centered radical when the proton is abstracted with b) a reactive free radical source and c) a stable free radical source.

The present invention, in addition, relates to a modified particle which includes a particle having, an organic group having, a $-SFR$ group, where the organic group is directly attached to the particle. The modified particle can also be a particle having an organic group having an $-X-SFR$ group, where the organic group is directly attached to the particle.

It is to be understood that both the foregoing general description and the following detailed description are exemplary and explanatory only and are intended to provide further explanation of the present invention, as claimed.

DETAILED DESCRIPTION OF THE PRESENT INVENTION

In one embodiment, the present invention relates to a modified particle comprising a particle having attached a group having the formula:

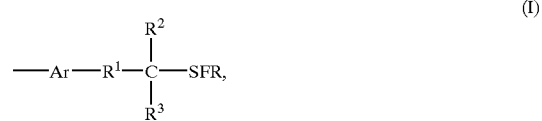

(I)

wherein Ar represents an aromatic group which is attached to the particle; $R^1$ represents a bond, an arylene group, an alkylene group,

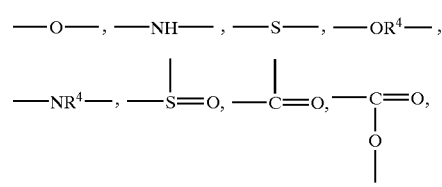

-continued

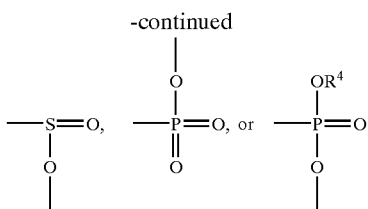

wherein R⁴ is an alkyl or alkylene group or an aryl or arylene group; R² and R³, which can be the same or different, represent hydrogen, an alkyl group, an aryl group, —OR⁵, —NHR⁵, —NR⁵R⁵, or —SR⁵, wherein R⁵, which can be the same or different, represents an alkyl group or an aryl group; and SFR represents a stable free radical.

The particle, to be modified, can be any particle capable of having a group represented by any one of formulas described herein attached thereto, such as formula (I)–(IV). Preferably, the particle has a carbon reactive site (C—), since in a preferred embodiment for the groups of formula (I) and (III), —SFR and —X—SFR are preferably attached through a carbon bond on the particle. The particle, for instance, can be carbon products, metal oxides (e.g., silica), metal hydroxides, multiphase aggregates comprising a carbon phase and a silicon-containing species phase, multiphase aggregates comprising a carbon phase and a metal-containing species phase, and the like. The carbon may be of the crystalline and/or amorphous type. Examples of carbon products include but are not limited to, graphite, carbon black, vitreous carbon, activated charcoal, activated carbon, carbon fiber, and mixtures thereof. Finely divided forms of the above are preferred. Most preferably, the particle is a carbon product, and most preferably carbon black.

The multiphase aggregate containing the carbon phase and the silicon-containing species phase can also be considered a silicon-treated carbon black aggregate and the multiphase aggregate containing a carbon phase and a metal-containing species phase can be considered to be a metal-treated carbon black aggregate as long as one realizes that in either case, the silicon-containing species and/or metal-containing species are a phase of the aggregate just like the carbon phase. The multiphase aggregates do not represent a mixture of discrete carbon black aggregates and discrete silica or metal aggregates and is not a silica coated carbon black. Rather, the multiphase aggregates used in the present invention include at least one silicon-containing or metal-containing region concentrated at or near the surface of the aggregate (but put of the aggregate) and/or within the aggregate.

The aggregate, thus contains at least two phases, one of which is carbon and the other of which is a silicon-containing species, a metal-containing species, or both. The silicon-containing species that can be a part of the aggregate is not attached to a carbon black aggregate like a silica coupling agent, but actually is part of the same aggregate as the carbon phase. For instance, when the multiphase aggregate having a carbon phase and a silicon-containing species phase is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

The metal-treated carbon blacks are aggregates containing at least a carbon phase and a metal-containing species phase. The metal-containing species include compounds containing aluminum, zinc, magnesium, calcium, titanium, vandium, cobalt, nickel, zirconium, tin, antimony, chromium, neodymium, lead, tellurium, barium, cesium, iron, and molybdenum. Preferably, the metal-containing species phase is an aluminum- or zinc-containing species phase. The metal-containing species phase can be distributed through at least a portion of the aggregate and is an intrinsic part of the aggregate.

Further, it is within the bounds of the present invention to have a metal-treated carbon black containing more than one type of metal-containing species phase or the metal-treated carbon black can also contain a silicon-containing species phase and/or a boron-containing species phase. For example, the metal-treated carbon black of the present invention can have an aggregate comprising a carbon phase, an aluminum-containing species phase, and a zinc-containing species phase. Accordingly, the multiphase aggregates used in the present invention can have two or more different types of metal-containing species phases and/or additional non-metal species phases.

Preferably, for purposes of the present invention, the amount of elemental silicon and/or elemental metal present in the multiphase aggregate is from about 0.1 to about 25 wt. %, more preferably, from about 0.5 wt. % to about 10 wt. %, and most preferably from about 0.2 wt. % to about 5.4 wt. %, by weight of the aggregate.

The details of making the multiphase aggregates are explained in U.S. patent application Ser. No.: 08/446,141, filed May 22, 1995; Ser. No. 08/446,142, filed May 22, 1995, Ser. No. 08/528,895, filed Sep. 15, 1995; and Ser. No. 08/750,017, filed Nov. 22, 1996, which is a National Phase Application of PCT No. WO 96/37547, filed May 21, 1996, U.S. patent application Ser. No. 08/828,785, filed Mar. 27, 1997, U.S. patent application Ser. No. 08/837,493 filed Apr. 18, 1997 and Ser. No. 09/061,871 filed Apr. 17, 1998. All of these patent applications are hereby incorporated in their entireties herein by reference.

A silica-coated carbon product can also be used as the particle, such as that described in PCT Application No. WO 96/37547, published Nov. 28, 1996. which is hereby incorporated in its entirety herein by reference.

Particles useful for the present invention may, for example, have primary particles sizes in the general range of from about 10 nm to about 500 nm, and preferably from about 10 nm to about 250 nm, and primary aggregate sizes in the general range of from about 50 nm to about 100 microns, preferably from about 50 nm to about 10 microns, still more preferably from about 75 nm to about 1 micron. The BET surface area of these particles can be any suitable surface area and preferably ranges from about 10 m²/g to about 2000 m²/g and more preferably, from about 10 m²/g to about 1,000 m²/g, and still more preferably from about 50 m²/g to about 500 m²/g; and the particle structure preferably ranges from about 10 cc/100 g to about 1000 cc/g, more preferably, from about 50 cc/100 g, to about 200 cc/100 g.

The number of SFR groups directly attached to the particle prior to polymerization can be any amount. For instance, the number of —SFR groups may range from about 0.01 mmole/g (of particle) to about 10 mmole/g, or from about 0.1 mmole/g to about 4 mmole/g, or from about 0.05 mmole/g to 4 mmole/g or from about 0.5 mmole/g to about 3 mmole/g, or from about 0.1 mmole/g to about 2 mmole/g.

When the particle is a multiphase aggregate, like a particle comprising a carbon phase and a silicon-containing species phase, preferably the group of formula (I) or (III) is attached at least, if not exclusively, on the carbon phase.

With regard to the aromatic group (Ar), any aromatic group may be used. Unlike the polymerizable monomer discussed later, the aromatic group is not a polymer and is not polymerized. Examples include, but are not limited to, arylene groups. Preferred arylene groups include, but are not limited to, phenylene and naphthalene groups.

With respect to $R^1$, preferred arylene groups include, but are not limited to, benzene ring containing groups. Preferred alkylene groups include, but are not limited to, $C_1$–$C_{18}$ alkylene-containing groups. These groups can be linear, branched, or unsaturated. These examples of arylene and alkylene groups can also be considered examples of $R^4$. Preferred alkyl groups for $R^4$ are $C_1$–$C_{20}$ alkyl groups, more preferably $C_1$–$C_5$ alkyl groups and preferred aryl groups are phenyl, biphenyl, and naphthyl.

With respect to $R^2$ and $R^3$, which can be the same or different, examples of alkyl groups (e.g. $C_1$–$C_{20}$ alkyl group) include, but are not limited to, methyl, ethyl, propyl, butyl, and the like. Preferably, the alkyl group is a $C_1$–$C_5$ alkyl group. Examples of aryl groups include but are not limited to phenyl, biphenyl, and naphtlhyl. The alkyl and aryl groups mentioned here as well as the arylene and alkylene groups mentioned throughout can be unsubstituted or substituted for purposes of the present invention. $R^5$ can be the same type of alkyl and aryl groups mentioned above with respect to $R^2$ and $R^3$.

SFR, which is the stable free radical, can be any radical capable of capping the remaining portion of the group attached onto the particle. Examples of the SFR include, but are not limited to, nitroxide free radicals such as 2,2,5,5-tetramethyl-pyrrolidinyloxy and 2,2,6,6-tetramethyl-piperindinyloxy, organic hydrazyl compounds, organic verdazyl compounds, organic aroxyl compounds (e.g., 2,4,6 tri-tertiary butyl phenoxy radical, galvinoxyl (2,6 ditertiary butyl alpha 3,5 ditertiary butyl oxo 2,5 cyclohexadiene-1 ylidene para tolyoxy) radical), aryl alkyl or aryl cycloalkyl where the unpaired electron is on a carbon atom, substituted triphenyl methyl, substituted triphenyl amine, and derivatives of these compounds.

The SFR used in the present invention preferably has the formulas:

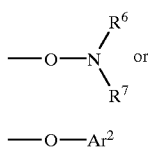 (V)

or

—O—$Ar^2$ (VI)

wherein $R^6$ and $R^7$, which can be the same or different, represent a substituted or unsubstituted alkyl or cycloalkyl group; and $Ar^2$ represents a substituted or unsubstituted aromatic group. Representative examples of the alkyl and aromatic groups can be the same as described above with respect to the substitutents $R^2$ and $R^3$.

Another embodiment of the present invention relates to a modified particle or aggregate having a group of formula (II) attached thereto. The particle can be a metal oxide, a metal hydroxide, an aggregate comprising a carbon phase and a metal-containing species phase, or an aggregate comprising a carbon phase and a silicon-containing species phase. Attached to this particle or aggregate is a group having the formula:

wherein CoupA represents a Si-containing group, a Ti-containing group, or a Zr-containing group; $R^8$ and $R^9$, which can be the same or different, represent hydrogen, an alkyl group, an aryl group, —$OR^{10}$, —$NHR^{10}$, $NR^{10}R^{10}$, or —$SR^{10}$, wherein $R^{10}$ represents an alkyl group or an aryl group; SFR represents a stable free radical, and where n is an integer of from 1 to 3. Preferably, CoupA is attached to the particle or aggregate, especially in the case of a Si-containing group, via an oxygen radical which can form a part of a CoupA.

Examples of Si-containing groups include, but are not limited to, dimethylsilylmethyl, dialkoxysilylmethyl, and the like. Examples of Ti-containing groups include, but are not limited to, alpha substituted tri-acetyl titanate and the like. Examples of Zr-containing groups include, but are not limited to, dialpha methoxy neopentylzirconate and the like.

Examples of the substituents $R^8$ and $R^9$ can be the same as the substituents $R^2$ and $R^3$ mentioned above. Likewise, examples of the substituent $R^{10}$ can be the same as the substituent $R^5$ discussed above. Also, the SFR is the same as discussed above.

The modified particles having the attached group of the formulas, such as formula (I), can be made in the following manner. A particle, such as carbon black, can first have a vinyl substituted aromatic group attached to the particle. This attachment can be accomplished by the methods described in PCT International Application No. WO 96/18688 and U.S. Pat. Nos. 5,630,868; 5,559,169; 5,571,311; and 5,559,169 as well as U.S. patent application Ser. No. 08/572,525, all of which are hereby incorporated in their entireties by reference herein.

The particle having the attached vinyl substituted aromatic group is then reacted with a reactive free radical source and a stable free radical source for a sufficient time and at a sufficient temperature to form the modified particle having the attached group, like that of formula I. The molar ratio of the reactive free radical source to the stable free radical source is from about 0.7 to about 2.0, and preferably from about 0.9 to about 1.1. Examples of the reactive free radical source include but are not limited to radicals generated from organic peroxides such as benzoyl peroxides and azo initiators such as azobisisobutyronitrile, and the like. The reactive free radical source is present in amounts sufficient to react with the vinyl aromatic group present on the particle. Preferably, the amount of the reactive radical source is from about 0.01 mmoles/g (of particle) to about 10 mmoles/g and more preferably from about 0.01 to about 5 mmoles/g.

Alternatively, the modified particles of the present invention can be made by first forming the groups of the formulas described above, such as formula (I). Preferably, the stable free radical group is attached in the meta or para position of the aromatic group. This group is then attached to the particle by a diazonium treatment in the manner described in the above referenced patents and patent applications, where a diazonium salt will first be formed containing a group of one of the formulas described above in the manner described in the above-referenced patents. The groups of the formulas can be then subsequently attached to the particle. In a less preferred way, the formulas of the present invention can be attached to the particle through a hydroxyl or carbonyl group present on the particle. Also, the modified particle of the present invention can be formed by attaching a stable free radical compound containing at least one alkoxy silyl, alkoxy titanyl, or alkoxy zirconyl group to the particle which, in this particular process is preferably a metal oxide or metal hydroxide, or a carbon surface. This particular embodiment would attach a group of formula (II) or (IV) to a particle.

In another process, the modified particle can be formed by first taking an aromatic group and reacting it with a compound to form the groups of the formulas described above except for the presence of the —SFR group. In other words, a group having the formula Ar—$R^1$—$CR^2R^3$ would first be formed and then the —SFR would be attached to this group to form a group of formula (I) of the present invention which can then be attached to the particle. In this process, $R^2$ and $R^3$ are preferably hydrogen.

A related process involves first taking an aromatic group, such as a group having the formula Ar—$R^1$—$CR^2R^3$ and attaching it onto the particle, for instance by a diazonium treatment in a manner described above, and then attaching the —SFR group to form a group of formula (I) of the present invention. Example 7 of the present application shows a specific embodiment of this process. In more detail, this process involves proton abstraction wherein a group containing an abstractable proton which leaves behind a carbon-centered radical is attached onto an aromatic group, wherein the aromatic group is directly attached to the particle. For purposes of this process the aromatic group can first be attached to the particle and then subsequently a group containing the abstractable proton can then be attached or an aromatic group containing an abstractable proton can be attached onto the particle, for instance, by a diazonium treatment as described above. Then, a reactive free radical source and a stable free radical source are reacted with the particle having the attached aromatic group with the group containing an abstractable proton for a sufficient time and at a sufficient temperature to form the modified particle having the attached group, like that of formula (I). This modified particle having the attached group, like that of formula (I) can then be subjected to polymerization reactions in order to have polymers attached thereto such as set forth in formula (III). In this process, the reactive free radical source abstracts the proton from the group containing the abstractable proton which thus leaves a carbon-centered radical behind which permits the stable free radical source to attached thereto to create the modified particles of the present invention such as set forth in formula (I). Examples of a group containing an abstractable proton which leaves behind a carbon-centered radical include alkyl groups, alkenes with a hydrogen atom in the alpha position to the olefinic bond, and the like. Specific examples include $C_1$–$C_{20}$ alkyl groups, such as methyl, ethyl, propyl, butyl, and the like. The reactive free radical source for this process can be organic peroxides such as benzoyl peroxides and t-butyl peroxides. Examples of the stable free radical source are described above and can be the same for this process. This process can also be applied where the modified particle aggregate has a group attached like that of formula (II) and (IV).

Alternatively, the process of making the modified particles of the present invention can be a three step process where Ar is first attached to the particle and then the group having the formula $R^1$—C—$R^2R^3$ can be attached to the aromatic group. Then in a third step, the —SFR can be attached to the $R^1$—C—$R^2R^3$ group.

Also, in making the modified particles having the attached group of one the formulas described above, an aliphatic vinyl group can be attached to the particle surface by a diazotisation of a vinyl substituted amino aromatic compound, or a vinyl substituted alkoxy silyl, titanyl, or zirconyl derivative. The vinyl group is then reacted with an organic peroxide and a stable free radical such that the organic peroxide and stable free radical are present in an amount sufficient to react with at least one percent of the vinyl groups and preferably from about 50 to about 100% of the vinyl groups and the mole ratios of the organic peroxide to stable free radical are preferably from about 0.5:1 to about 1:1.

The modified particles of formula (II) can be made in the following manner. The aggregate comprising a carbon phase and a metal-containing species phase can be made as described in U.S. patent application Ser. No. 08/828,725, hereby incorporated herein by reference. The aggregate comprising a carbon phase and a metal containing species phase can be made as described in U.S. patent application Ser. Nos. 08/446,141 and 08/750,017. The aggregate or particle can then be reacted with a coupling agent by adding the coupling agent to the aggregate in a medium and mixing. Then, the aggregate or particle having the attached coupling group can be reacted with a reactive radical source and stable free radical source as described above.

For purposes of the above-described reactions, the reaction should occur for a time and temperature sufficient to form the attached group onto the particle or aggregate. Generally, this time is from about 3 minutes to about 96 hours and more preferably from about 1 hour to about 24 hours. The temperature of the reaction is dependent on the half-life of the peroxide, preferably from about 50° C. to about 200° C., and more preferably from about 75° C. to about 125° C.

With the modified particles described above, polymers can be attached onto these attached groups by reacting these modified particles or aggregates with a polymerizable monomer such as a vinyl or diene containing monomer. Specific examples of such monomers include, but are not limited to styrene, isoprene, butadiene, chloromethylstyrene, methyl methacrylate, and butyl methacrylate, as well as acrylic acid and esters of acrylic acid and methacrylic acid and esters of methacrylic acid. Mixtures of two or more monomers can be also used and/or polymerized sequentially.

The polymerization reaction is conducted under conditions which permits the polymerization of the monomer so that it forms a part of the group attached onto the particle or aggregate. These conditions are preferably heating modified particles with a monomer above 80° C., preferably from about 120° C. to about 150° C., optionally in the presence of a solvent. The reaction can be ended by lowering the temperature below 80° C. The polymer-modified particle can then be subjected to distillation, steam stripping, or precipitation or other known methods in order to remove residual monomers and solvents.

The polymerization reaction thus can produce any length of polymer on the modified particle or aggregate. For example, polymers having average molecular weights, preferably ranging from about 1,000 to about 1,000,000 can be made. The polymers can be any type, such as homopolymers, copolymers, ter-polymers, or higher chain polymers. The polymers can also be block, graft, or random-type polymers.

Once the polymerization occurs, the modified particle will have a group attached having the formula:

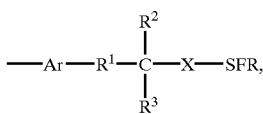

wherein the substituents are the same as described earlier for formula (I) and X is a polymer formed from at least one polymerizable monomer.

Similarly, when the modified particle or aggregate having a group of formula (II) is polymerized by the introduction of one or more monomers, the group attached to the particle or aggregate will have the formula:

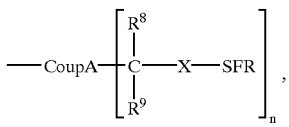

wherein the substituents are the same as described in formula (II) and X is a polymer formed from at least one polymerizable monomer.

In another embodiment, a modified particle has an organic group containing a —SFR group directly attached to the particle. Preferably, the —SFR group is directly attached to the particle. The —SFR group and particle can be the same as discussed above. This type of modified particle can be prepared by heating a particle, like carbon black, with a organic group comprising a stable free radical in a solvent, such as toluene and preferably, in an inert atmosphere. With this modified particle having an attached organic group having a —SFR group, polymers can be attached onto the —SFR group by reacting the modified particle with a polymerizable monomer as discussed above using the same procedure.

With any of the above-described groups containing the —SFR group, the modified particle or aggregate containing the —SFR group can be terminated by any means known to those skilled in the art in view of the present application. In particular, the —SFR group can be replaced with a proton, subjected to disproportionation, or replaced with a chemical group through group transfer and the like. For instance, the —SFR group can be replaced with a hydroxy or halide group, or other terminating group known to those skilled in the art. This termination of removing the —SFR group and replacing it or terminating it with another group can be accomplished, for instance, by methods described in 214 ASC Nat'l Mtg, Las Vegas. Sep. 7–11, 1997. Paper in ORGN O61, Gravert, D. J.: Datta A.; Wentworth P., Jr.: Janda. K. D., which are incorporated in their entirety by reference herein.

The modified particles of the present invention can form part of a polymeric composition and be present with other ingredients commonly used and found in polymeric compositions.

The modified particle of the present invention can be used in a variety of applications. For instance, it can be used in coating or ink compositions, such as printing inks and ink jet inks, toners, automobile coatings, and the like. Also, the modified particles can be used as reinforcers for compositions, such as polymeric compositions and can also serve as impact modifiers, or as agents used to increase compatibility of a polymeric composition.

In more detail, reinforcement of elastomeric compositions including tire, hose, profile extrusion, seals, gaskets, and vibration isolation units, as well as the specific reinforcement of a single elastomer phase in a multiphase elastomer blend composition; reinforcement of thermoplastic compositions such as polyolefines, styrenic, acrylics, polyesters and polyamides, and thermoplastic elastomers and thermoplastic polyolefines; reinforcement of thermoset compositions, e.g., acrylics; impact modification of thermoplastic compositions; impact modification of thermosets; highly dispersible masterbatch for pigmentation, reinforcement, and/or UV protection of thermoplastic compositions, coatings, thermoplastic elastomers, and crosslinked compositions; as a synthetic support for solid phase organic synthesis; as a support or medium for effluent extraction processes—both organic and inorganic components; as a catalyst support; and/or as a superadsorbant for either aqueous of hydrocarbon materials e.g., use in sanitary wear, growing medium for plants.

The present invention will be further clarified by the following examples, which are intended to be purely exemplary of the invention.

EXAMPLES

Example 1

Attachment of 2,2,6,6 tetramethyl piperidinyloxy free radical (TEMPO) to carbon black.

TEMPO and carbon black grade Vulcan 7H® were added to toluene and heated under an inert atmosphere at 130° C. for 96 hours. The carbon black was filtered from the toluene, washed with deionized water, and dried.

Kjeld analysis of the resultant carbon black indicated that the nitrogen content of the carbon black had increased from 0.040% to 0.57% by weight. This equates to 0.09 micromoles of TEMPO attachment per sq meter of carbon black surface area.

Comparing this example with attachment of sulfonic acid via a diazotization process, this equates to about 3% of surface coverage.

Example 2

The TEMPO modified carbon black prepared in Example 1 was combined with freshly distilled styrene and heated for various time intervals indicated in the Table under an inert argon atmosphere.

After completion of the specific time interval, the reaction was terminated by removing the heat source. The treated carbon black samples were filtered and extracted under Soxhlet refluxing conditions with tetrahydrofuran for 48 hours.

Analysis of the treated carbon black samples for organic content was carried out using TGA analysis and heating rate of 20° C./minute under a nitrogen flow rate of 50 ml/minute.

| Temperature (° C.) | Time (hours) | organic content (% by weight of carbon black) |
|---|---|---|
| 125 | 16 | 1.12% |
| 150 | 16 | 2.46% |
| 130 | 72 | 16.5% |

Example 3

Vinyl benzene functionalized carbon black prepared by the diazotization of amino styrene (using the procedure in U.S. Pat. No. 5,571,311) was reacted with benzoyl peroxide and TEMPO for 16 hours at 70° C. under an argon atmosphere. The resultant carbon black was extracted with tetrahydrofuran and submitted for nitrogen analysis using the Kjeld technique, which indicates 2 micromoles of TEMPO attachment per sq. meter of carbon black surface area.

| Carbon Black Amount (by weight) | Polystyrene Amount (by weight) | Temperature (° C.) | Time (hours) | Polymer Attachment by TGA (by weight) |
|---|---|---|---|---|
| 10% | 90% | 140 | 44 | 9.4% |
| 50% | 50% | 125 | 23 | 6.2% |

Example 7

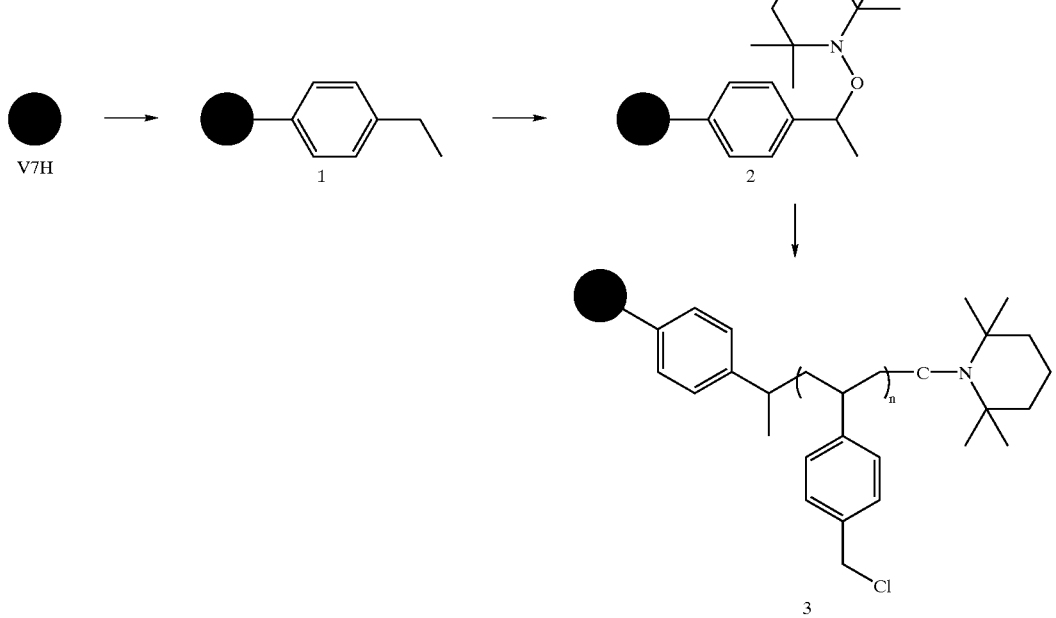

Example 4

The modified carbon black described in Example 3 was heated with styrene under an inert argon atmosphere for 72 hours at 130° C. The reacted carbon black was extracted with tetrahydrofuran under Soxhlet reflux conditions for 48 hours to remove any unattached polystyrene. TGA analysis indicated that the reacted carbon black contained 35% (by weight of carbon black) organic material.

Example 5 (Comparative)

Using the procedure described by Georges in *Macromolecules*, vol. 26, pages 2987–8, (1993), a TEMPO terminated polystyrene was produced with a molecular weight, determined by GPC, of 11,200 and a polydispersity of 1.3.

Example 6 (Comparative)

The TEMPO terminated polystyrene produced in Example 5 was heated with carbon black in toluene under an inert argon atmosphere, and under the conditions set forth in the Table below. The resultant carbon black was extracted with tetrahydrofuran to remove unattached polymer, and the residual polymer attached to carbon particle was determined by TGA analysis.

Ethylaniline Carbon Black Adduct 1
To a suspension of ethylaniline (4 mmol) in water (60 mL) was added hydrochloric acid (37%, 8.0 mmol) and Vulcan® 7H carbon black (10 g). A solution of sodium nitrite (4.4 mmol) in water (5 mL) was added slowly and the solution stirred under air for 30 min. The temperature was increased to 70° C. and sting continued for 3.5 h. The solution was filtered and washed with water (4×100 mL) and dried in a vacuum oven for 24 h.

Tempo Carbon Black Adduct 2
The modified carbon black 1 (50 g, 0.4 mmol/g, 20 mmol) was purged with $N_2$ for 30 min, followed by addition of toluene (250 mL), and TEMPO (40 mmol)., t-Butylperoxide (100 mmol) was added dropwise and the solution heated at 100° C. for 48 h. Methanol (100 mL) was added, and the modified carbon black removed by filtration, followed by washing with methanol into the washings were colorless (4×200 mL).

Poly(chloromethylstyrene) Modified Carbon Black 3
The modified carbon black 2 (10 g, 4 mmol) was purged with $N_2$ for 30 min., followed by addition of toluene (50 mL) and chloromethylstyrene (40 mmol). The solution was heated at 130° C. for 72 h with stirring under nitrogen. Methanol (50 mL) was added and the solution filtered. The residue was washed with methanol until the washings were colorless (4×100 mL). An additional soxhlet extraction was conducted for 72 h on samples intended for analysis.

While ethyl aniline was diazotized onto carbon black, this method is equally applicable to other particle surfaces where an alkyl group or other group containing an abstractable proton is available or able to be applied by chemical reaction. By-products of this reaction are limited to t-butanol and unreacted TEMPO, allowing facile purification and recycling of products and reagents. This method may be utilized for the abstraction of a proton from an alkyl group or other group by any peroxide. The material formed may then either be employed as a initiator for "living" free radical polymerizations by addition of a monomer, or purified by precipitation and/or extraction before reacting with a monomer. Reaction of the TEMPO adduct under standard TEMPO "living free radical polymerization conditions results in the formation of a polymer, as analyzed by elemental analysis and TGA. This method may be utilized to polymerize any reactive monomer known to react under "living" free radical polymerization conditions. In addition to the cost benefits that this method provides, it also provides a cleaner route to industrial scale polymer modified particles.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a modified particle comprising a particle having attached a group having the formula:

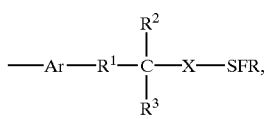

(III)

wherein said method comprises: reacting a modified particle having the formula:

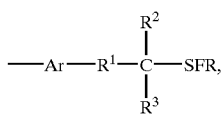

(I)

with a polymerizable monomer,
wherein Ar represents an aromatic group; $R^1$ represents a bond, an arylene group an alkylene group,

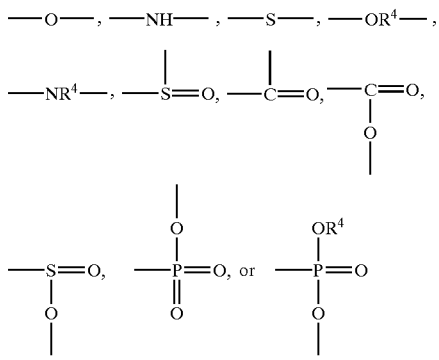

wherein $R^4$ is an alkyl or alkylene group or an aryl or arylene group; $R^2$ and $R^3$, which can be the same or different, represent hydrogen, an alkyl group, an aryl group, $—OR^5$, $—NHR^5$, $—NR^5R^5$, or $—SR^5$, wherein $R^5$, which is the same or different, represents an alkyl group or an aryl group; SFR represents a stable free radical; and X represents a polymer formed from at least one polymerizable monomer.

2. The method of claim 1, wherein said polymerizable monomer is a vinyl or diene containing monomer.

3. The method of claim 1, wherein said particle is a carbon product, a metal oxide, a metal hydroxide, or mixtures thereof.

4. The method of claim 1, wherein said particle is graphite, carbon black, vitreous carbon, activated charcoal, carbon fiber, activated carbon, or mixtures thereof.

5. The method of claim 1, wherein said particle is an aggregate comprising a silicon-containing species phase and a carbon phase.

6. The method of claim 1, wherein said particle is an aggregate comprising a metal-containing species phase and a carbon phase.

7. The method of claim 1, wherein said particle is carbon black.

8. The method of claim 1, wherein said SFR is 2,2,5,5-tetramethyl-1-pyrrolidinyloxy, 2,2,6,6-tetramethyl-1-piperindinyloxy, or derivatives thereof.

9. The method of claim 1 further comprising terminating the —SFR group.

10. The method of claim 9, wherein said termination is accomplished by replacing the —SFR group with a proton, by disproportionation, or by replacement with a chemical group other than the —SFR group.

11. The method of claim 10, wherein said chemical group is a hydroxy group or halide group.

* * * * *